C. W. STAHLE.
COMBINED COAT AND HAT HOLDER.
APPLICATION FILED MAY 24, 1919.
1,415,126.
Patented May 9, 1922.
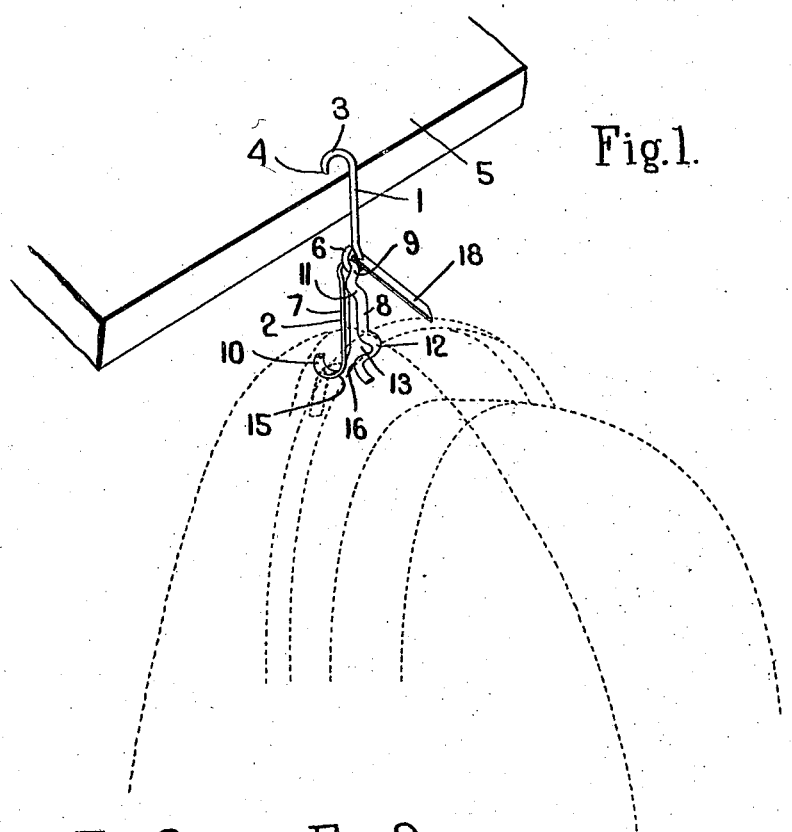
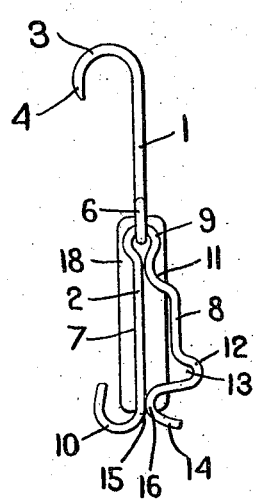
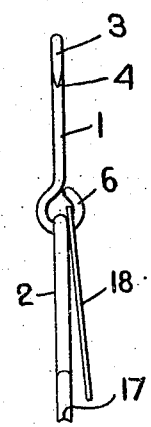
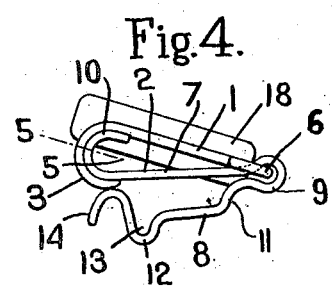
Inventor.
Carl W. Stahle
by Heard Smith & Tennant.
Attys.

UNITED STATES PATENT OFFICE.

CARL W. STAHLE, OF EVERETT, MASSACHUSETTS.

COMBINED COAT AND HAT HOLDER.

1,415,126.          Specification of Letters Patent.      Patented May 9, 1922.

Application filed May 24, 1919. Serial No. 299,426.

*To all whom it may concern:*

Be it known that I, CARL W. STAHLE, a citizen of the United States, residing at Everett, county of Middlesex, State of Massachusetts, have invented an Improvement in Combined Coat and Hat Holders, of which the following description, in connection with the accompanying drawing, is a specification, like characters on the drawing representing like parts.

This invention relates to a combined coat and hat holder of that type comprising a supporting element adapted to be attached to a hook, nail, shelf, etc., and a combined coat and hat-holding member which is pivotally connected to the supporting member in such a way as to permit the two members to be folded together so that the device can be carried in a vest pocket.

The object of the invention is to provide a novel coat and hat holder of this type which has various improved features, all as will be more fully hereinafter described and then set forth in the appended claims.

In the drawings wherein I have shown one embodiment of my invention, Fig. 1 is a perspective view of my coat and hat holder showing the manner in which it is used;

Fig. 2 is a side view of said coat and hat holder;

Fig. 3 is an edge view thereof;

Fig. 4 shows the device folded and in condition to be carried in the pocket;

Fig. 5 is a section on the line 5—5, Fig. 4.

The complete device comprises a supporting member 1 which is adapted to be sustained from some suitable support, and a novel combined coat and hat-holding member 2 which is pivotally secured to the supporting member 1. The supporting member is preferably made of wire and is provided with a shank having a hook 3 at its upper end, the end 4 of the hook preferably being sharpened so that it will readily retain its hold on the edge of a shelf 5 or other similar support. The lower end of the supporting member 1 is provided with an eye 6 from which the coat and hat-holding member 2 is pivotally sustained. Said member 2 comprises the two legs 7 and 8 which are connected by a loop portion 9 that extends through the eye 6 thereby making a pivotal connection between these two parts.

The leg 7 is preferably made straight and is provided at its lower end with a hook 10 on which a coat may be hung, said hook being shaped so that it is upturned when the device is in use, as shown in Figs. 1 and 2. The leg 8 is bent laterally from the leg 7, as shown at 11, so that the main portion of the leg 8 extends substantially parallel to but spaced from the leg 7. The outer end of the leg 8 is provided with the U-bend 12 which forms a recess 13, and the extremity 14 of the leg 8 is then bent outwardly to make with the hook 10 a flaring throat leading to the space between the legs 7 and 8. The legs 7 and 8 are preferably resilient so that when the brim of a hat is inserted between them the resiliency of said legs will produce sufficient frictional hold on said hat brim to retain the hat in position.

The construction shown is adapted to receive and hold equally well either a derby hat, a soft hat or straw hat. A derby hat is usually provided with a bead at the periphery of the rim, and in using this device for supporting a derby hat, the edge of the rim will be inserted between the legs 7 and 8, and the bead at the periphery of the rim will be set into the recess 13. A soft hat is supported by inserting the brim between the legs 7 and 8 for any desired distance, said brim being firmly held between the portions 15 and 16 of said legs 7 and 8. A straw hat can be held by inserting the brim between the legs 7 and 8 as far as they will go, the space provided between the legs 7 and 8 by the bend 11 being sufficient to receive relatively thick brims of straw hats.

The size of the coat-supporting hook 10 is such relative to the hook 3 that when the two members are folded together, as shown in Fig. 4, the hook 3 will embrace the hook 10 and the point of the hook will be received in the flaring throat between the two legs 7 and 8, all as seen in Fig. 4.

I will preferably make the back side of the hook 10 with a slight groove 17 extending longitudinally thereof into which the hook 3 is received when the device is folded. The size of the hook 3 is such that said hook has to be sprung into the groove 17. The presence of this groove 17 firmly holds the hook in folded relation so that there is no danger of its becoming opened out when it is being carried in the vest pocket.

I may if desired provide a name plate or tag 18 which is secured to the eye 6 and which carries the name of the party to whom the device belongs. This tag serves to identify the garments on the hook when the latter is hung up among a number of other garments.

One advantage incident to this invention is that each person can carry in his vest pocket a means for hanging up his coat and hat, and if when he desires to divest himself of these garments there is no permanent coat hook, he can hang his garments on this hook and support the latter from any nail, shelf or other projection with which the supporting hook 3 can have engagement.

I claim:

1. In a combined coat and hat hanger, the combination with two members pivotally connected together, one of said members being in the form of a supporting hook and the other constituting a coat and hat-holding member and comprising two resiliently-connected legs between which the brim of a hat may be frictionally held, one of said legs being shaped at its end to form a hook to support a coat or garment, the external curvature on said hook corresponding in size and shape to the internal curvature of the supporting hook, and the pivotal connection between said members and the relative length thereof permitting the holding hook to be received within the supporting hook with the hooks facing in opposite directions when the members are folded together, whereby each hook acts to protect the point of the other hook when in folded position.

2. In a combined coat and hat holder, the combination with two members pivotally connected together, one of which is in the form of a supporting hook and the other of which constitutes a coat and hat-holding member and comprising two resiliently-connected legs between which the brim of a hat may be held, the supporting hook being of a size to enclose the coat-holding hook when the members are folded and when said members are so folded the point of the supporting hook being received between the legs of the coat and hat-holding member whereby the points of both hooks are protected In testimony whereof, I have signed my name to this specification.

CARL W. STAHLE.